United States Patent
Froning et al.

(10) Patent No.: US 7,627,460 B2
(45) Date of Patent: Dec. 1, 2009

(54) METHOD FOR THE MODELING OF MATERIAL AND/OR HEAT EXCHANGE PROCESS IN A DEVICE AND DEVICE FOR CARRYING OUT SAID METHOD

(75) Inventors: Dieter Froning, Niederzier (DE); Andreas Gubner, Niederzier (DE); Manfred Poppinger, Uttenreuth (DE)

(73) Assignee: Forschungszentrum Julich GmbH, Julich (DE)

( * ) Notice: Subject to any disclaimer, the term of this patent is extended or adjusted under 35 U.S.C. 154(b) by 555 days.

(21) Appl. No.: 10/554,437

(22) PCT Filed: Apr. 15, 2004

(86) PCT No.: PCT/DE2004/000788
§ 371 (c)(1),
(2), (4) Date: Jun. 19, 2006

(87) PCT Pub. No.: WO2004/097969
PCT Pub. Date: Nov. 11, 2004

(65) Prior Publication Data
US 2007/0038423 A1 Feb. 15, 2007

(30) Foreign Application Priority Data
Apr. 25, 2003 (DE) .............................. 103 19 062

(51) Int. Cl.
*G06G 7/50* (2006.01)
*H01M 4/36* (2006.01)
*H01M 6/24* (2006.01)

(52) U.S. Cl. ............................................ 703/9; 429/101
(58) Field of Classification Search ................ 429/101; 703/9
See application file for complete search history.

(56) References Cited

U.S. PATENT DOCUMENTS

| 5,004,424 A * | 4/1991 | Larminie ..................... 434/301 |
| 7,024,342 B1 * | 4/2006 | Waite et al. .................... 703/6 |
| 2002/0006152 A1 * | 1/2002 | Prasad et al. .................. 374/44 |
| 2003/0098149 A1 * | 5/2003 | Wellington et al. ........... 166/52 |

OTHER PUBLICATIONS

M. Poppinger and H. Landes, "Aspects of the Internal Reforming of Methane in Solid Oxide Fuel Cells" Siemens AG Corporate Technology, Erlangen, Germany, Iconics 7 (2001), pp. 7-15.*

(Continued)

*Primary Examiner*—Paul L Rodriguez
*Assistant Examiner*—Dwin M Craig
(74) *Attorney, Agent, or Firm*—Andrew Wilford

(57) ABSTRACT

Mass transfer and/or heat transport processes in a fuel-cell stack are controlled by first modeling a selected region of the stack with at least two fluid components separated from one another by solid material. Each fluid component of the selected region is then transformed into a respective auxiliary volume in which all of the fluid components and solid material in the region are assembled additionally and whose outer cell corresponds to that of the region. Then each auxiliary volume is divided into a lattice with individual lattice elements that are linked by references so that linked or coupled lattices result. Finally the exchange between the fluids in the fuel-cell stack is implemented via the references of the respective component lattices.

17 Claims, 2 Drawing Sheets

OTHER PUBLICATIONS

Jemei S., Hissel D., Pera M.C., Kauffmann J.M., "Black-box modeling of proton echange membrane fuel cell generators" IEEE ISBN 0-7803-7474-6, Published Nov. 5-8, 2002, pp. 1474-1478.*

Michael D. Lukas, Kwang Y. Lee, Hossein Ghezel-Ayagh, "Development of a Stack Simulation Model for Control Study on Direct Reforming Molton Carbonate Fuel Cell Power Plant", IEEE Transactions on Energy Conversion, vol. 14, No. 4, Dec. 1999, pp. 1651-1657.*

Sampath Yerramalla, Asad Davari, Ali Feliachi, "Dynamic Modeling and Analysis of Polymer Electrolyte Fuel Cell", IEEE 2002, pp. 82-86.*

Beale et al: "Numerical Studies of the thermoelectrochemical performance of fuel cells", National Research Council, Ottawa, Canada, 2002.

Beale et al: "Computer methods for performance prediction in fuel cells", Journal of Power Sources 118, 2003, pp. 79-85.

* cited by examiner

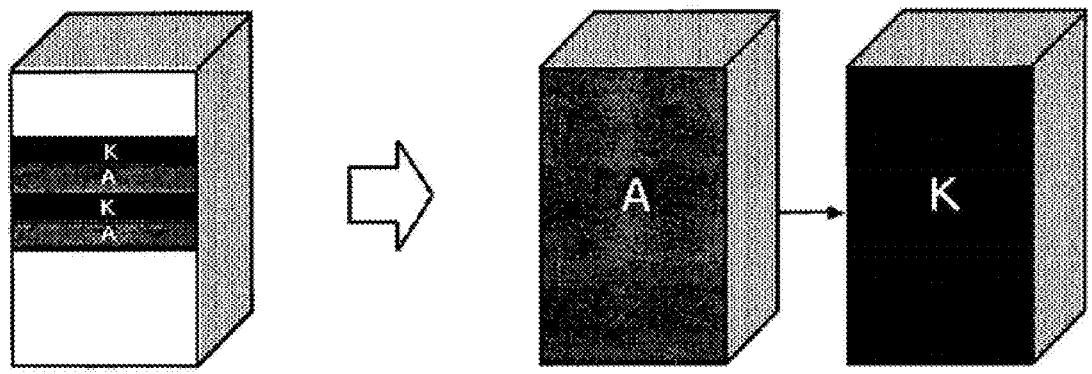
Fig. 2
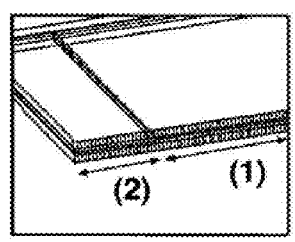 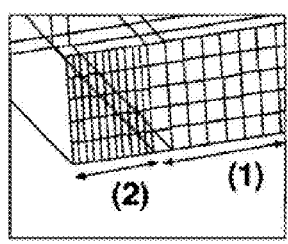 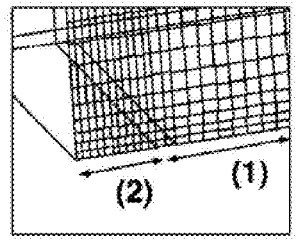
Fig. 3a  Fig. 3b  Fig. 3c

METHOD FOR THE MODELING OF MATERIAL AND/OR HEAT EXCHANGE PROCESS IN A DEVICE AND DEVICE FOR CARRYING OUT SAID METHOD

CROSS REFERENCE TO RELATED APPLICATIONS

This application is the US national phase of PCT application PCT/DE2004/000788, filed 15 Apr. 2004, published 11 Nov. 2004 as WO2004/097969, and claiming the priority of German patent application 10319062.7 itself filed 25 Apr. 2003, whose entire disclosures are herewith incorporated by reference.

FIELD OF THE INVENTION

The invention relates to a method of modeling mass transfer and/or heat transport processes in an apparatus comprising at least two fluid spaces like, for example, a high-temperature fuel-cell stack. The invention relates, further, to a computer system for carrying out the method.

State of the Art

Apparatuses in which mass transfer and/or heat transport processes play significant roles include, for example, high-temperature fuel cells (solid oxide fuel cells or SOFCs). They have an oxide ceramic electrode, which, as a rule, is in the form of a thin ion-conducting ceramic plate, on whose upper and lower sides the porous and electron-conducting electrodes are applied. The oxygen fed to the cathode side is reduced at the electrode to oxygen ions. The oxygen ions migrate through the ion-conducting ceramic plate at about 750° C. to 800° C. to the anode, at which the oxidation of the fuel gas occurs. The electrons which are liberated flow through an outer electronic circuit back to the cathode. The reaction products are carried off with the fuel gas stream. To increase the voltage, a plurality of cells are stacked on one another to a so-called fuel-cell stack. It is important for functional reliability of oxide ceramic high-temperature fuel cells that the individual cells of the stack be uniformly supplied with the fuel gas and that the respective electrochemically active regions be supplied uniformly with the fuel gas and air.

It is desirable to reduce the conventional operating temperature (950° to 1000° C.) used up to now, of the SOFC by at least 200K. This is a highly economical advantage. Such a requirement can be achieved by a targeted optimization of the individual cells of the SOFC based upon intensive material development and technological development. These developments are increasingly supported by a modeling simulation and optimization of the electrical and electrochemically active components, which can thus replace and/or supplement costly and expensive experiments.

For this modeling, initially, mathematical models are developed which should be capable of describing the physical-chemical processes in the fuel cell as precisely as possible. These processes include electrochemical reactions ($H_2$—oxidation, $O_2$—reduction), which are carried out on the interfaces between the electrolyte and electrodes. Since high-temperature fuel cells besides being supplied with hydrogen are also supplied with methane or other hydrocarbon fuels, chemical reactions like the methane/water vapor reformation and the $CO/H_2O$ shift reaction must also be taken into consideration. The reactants ($H_2$, $CH_4$, $O_2$) must be supplied to the reaction surfaces and the products ($H_2O$, $CO_2$) must be carried off. This means that, in addition, gas-phase mass transfer processes must be considered.

For SOFCs operated at a high temperature, the heat budgeting is of significant importance. A non-uniform temperature distribution can give rise to thermal stresses, and especially with the comparatively brittle ceramic components of the material used, like electrodes, electrolyte and glass solder joints of the interconnector plates, which can result in damage or destruction. The electrochemical reactions and the electrical current produce heat. This heat should be advantageously uniformly distributed and/or produced, for example, distributed by the thermal conductors and rapidly carried off by the coolant. In the case of high-temperature fuel cells, the air at the cathode side and, to a smaller degree the fuel, serve as suitable coolants. Air and fuel pick up the heat by convection and radiation.

A special role is here played by the internal reformation of hydrocarbon-containing fuels. This reformation utilizes the fact that such fuels, mixed with water, in the presence of an anode which usually contains nickel, can spontaneously be converted to hydrogen, carbon monoxide and a certain proportion of carbon dioxide in the SOFC. These reactions, over all, are endothermic and thus take up a portion of the heat which is produced by the electrochemical reactions and the current flow through the SOFC. The SOFC is cooled, in addition, to the convection and radiation cooling, therefore, by its endothermic, that is, heat-absorbing reaction enthalpy. The internal reformation contributes a further component to the internal heat balance of the SOFC. The modeling (computer simulation) for SOFC's with internal reformation supplies important information for the understanding of the SOFC's thus operated.

By targeted parameter variation, for example, for the geometry of the planer cell and the stack, taking into consideration the flow direction, for example, same-direction flow, cross-flow or counter-flow, the simulation calculations (optionally three-dimension or dynamic calculations) can provide decisive information for the design of the fuel cells. Simulation calculations thus provide a decisive aid in the design, including choice of design variants for the fuel cell, while enabling usually expensive and costly experiments to be avoided.

Through a modeling of a high-temperature fuel-cell stack (SOFC stack), as a rule, the following data should be supplied:
the flow distribution,
the concentration distribution,
the temperature distribution,
the current density distribution, and
the operating voltage of the individual cells of the stack, as well as the terminal voltage of the total stack for given total current or conversely.

The temperature distribution can be used in a complementary model for the thermomechanical stresses in order to calculate the stress distribution in the stack. Together with experiments, the simulation calculations supply a deeper understanding for the very complex processes within the stack, which may not be accessible, if only experiments are to be used as a basis for the knowledge.

Based upon simulated temperature distributions, for example, in the operation of a planar SOFC with internal reformation, distinctions can be made for the two parallel flow directions, that is, same direction flow or counter flow.

In the modeling known from the state of the art, there is, on the one hand, a pure heat transfer between the fluids in the respective fluid spaces, or flow paths at the anode side and the cathode side and the solid bodies comprised of electrodes, electrolytes and interconnector. The fluids correspondingly are the fuel and the oxidizing agent. In addition, the current production and the heat production between each two neighboring volume elements must be taken into consideration as they may result from chemical and electro-chemical reactions in the solid bodies comprised of the electrodes, electrolyte and interconnector in the SOFC at the contact surfaces between these neighboring volume elements. As a consequence, the modeling of a SOFC stack is basically carried out as follows:

The entire fuel cell stack is, based upon its geometry, divided into a so-called core region comprising fluid distributor structures (bipolar plates), anodes, cathodes and electrolytes, and the edge or boundary region comprising feeders and discharge conduits, also referred to as manifolds. In the case of a mirror symmetrical construction of a fuel-cell stack, usually a first abstraction step is developed and usually only half of the fuel-cell stack is considered.

In a first step, usually only one such plane is considered within the core region of a fuel cell in which the material transfer and heat transport are carried out. The dimensions of the lattice elements of the basic computing lattices are so oriented that they correspond to the geometry of the so called "smallest structure" which must be resolved within such a plane. As a rule, the fluid passages are treated within a fluid distribution structure. If their diameters are in the region of about 1 mm, a resolution, that is, the smallest dimension of the lattice element of $\frac{1}{10}$ can be selected, corresponding in this case to a resolution of 0.1 mm. In this manner, it is possible to ensure that the requirements for this region can be modeled with sufficient precision.

In the case of an actual fuel-cell stack with 5 plate-shaped fuel cells with dimensions each typically of 200×6 mm only for the core region, the number of lattice elements required for the modeling may be $1.2 \times 10^9$. In the boundary or edge region, which as a rule is not subjected to structural resolution to the same degree, the structure resolution as a rule is not to the same degree as within the core region. As a consequence, for the edge region or boundary region, a grid which is 10 times more coarse is selected with the calculating grid. However, care must be taken that locally increased gradients of the solution variables can give life to significant deviations from this scheme.

In a second abstraction step, all fluid spaces, for example, the gas passages, are collected in a plane and treated as a "porous plate". This plate is assigned a certain porosity which can be based upon the material actually used and represented by, for example, the ribs between the gas passages and those of the interconnector, as well as by the flow resistance of the individual fluid passages.

The advantage of this second abstraction is that several commercially available software programs supply resistance laws for pressure losses for a laminar flow in porous madia with a coarse calculating grid. The resolution can then be established at 1 mm to 2 mm, rather than the aforementioned 0.1 mm. This abstraction alone can reduce the number of calculating grid points by at least a factor of $10^3$.

In prior modeling approaches, one porous plate, for example, the anode, and a further porous plate, for example, the cathode, are treated as opposite one another. For each lattice element in the first porous plate, a corresponding, that is, opposing lattice element, in the second porous plate is treated as associated therewith. These two plates provide the basis for the calculations for a single cell. That is based upon the fact that a fuel-cell stack is actually constructed from multiplicity of individual layers with a thickness of about 1 mm. The individual layers (plates) are separately traversed by different fluids, for example, air or fuel. A further geometric abstraction is thus basically no longer possible.

This method is then carried out for as many double-plate units as there are individual cells in the fuel-cell stack to be modeled. This means that the more cells that the fuel-cell stack to be modeled has, the greater is the computing cost required for modeling it or the computer calculation time which is required. For example, in the case of a fuel-cell stack with 5 individual cells and the usual modeling carried out heretofore with about 700,000 lattice elements, a calculation time required as a rule was about 72 hours.

It is a drawback with the known state of the art for the simulation of fuel-cell stacks that the computing lattice resolution is the model also determined as a rule by the smallest structure to be resolved, especially the fluid spaces in a fuel cell. These are, for example, the dimensions of the gas passages. The computing lattices, as a rule, require lattice elements with a resolution of 0.1 mm for the core region and in the modeling of a fuel-cell stack which in actuality had 10 individual cells, the calculating time of several days was required for the resolution typically required by the skilled worker in the art.

The modeling used conventional programs like Computational Fluid Dynamics, or CFD, software or other known finite-element programs and were limited because of the computer capacity as a rule to the simulation of relatively small fuel-cell stacks. The afore-mentioned resolutions could, however, be supported. If it was desired or required to model, for example, stacks of 60 individual cells, for example, a 20 kilowatt apparatus, the modeling could not be done in a reasonable period of time with software currently on the market.

OBJECTS OF THE INVENTION

It is the object of the invention to provide a simplified method of modeling mass transfer and/or heat transport processes for an apparatus, especially in a high-temperature fuel-cell stack, which enables a modeling of the device with a sufficient resolution in a significantly shorter time than has been the case with the prior state of the art.

Especially it is an object of the invention to provide a method by which the modeling of mass transfer and/or heat transport process in a fuel-cell stack of at least 10 and advantageously up to 60 individual cells or more can be carried out with sufficient resolution in a realistic time period.

It is a further object of the invention to provide a corresponding computer support method as well as a device suitable for carrying out the method.

SUMMARY OF THE INVENTION

The key point and basic idea of the invention which can reduce the computer time required for the modeling of mass transfer and/or heat transport processes in a complex device is that also devices like a fuel-cell stack in the kilowatt range can be modeled reasonably. As a result, in the process, according to the information, the number of lattice elements in the computing lattice serving as a basis for the modeling of the device can be significantly reduced to great advantage without losing any of the information required for the feeding points for the mass transfer and/or the heat transport.

The method according to the invention is described below in great detail in an example of the modeling of high-temperature fuel-cell stacks. The method is, however, applicable and can be readily translated for all complex apparatuses using at least 2 mm spaces traversed by fluids in which mass transfer and/or heat transport processes take place and which require modeling.

According to the state of the art, for a fuel-cell stack with 5 individual cells of dimensions of 200×200×6 mm$^3$ and a resolution of the computing lattice of 0.1 mm in the core region, the modeling of a number of lattice elements in the region of 700,000 was required. By comparison thereto, with the method according to the information, an identical fuel-cell stack, advantageously only 20,000 lattice points are required which typically can be handled in a computer time of about 6 hours. A enlargement of the fuel cell stacks to be modeled to, for example, 60 individual cells, can be simulated using the method of the information advantageously with, for example, 300,000 lattice elements. This corresponds to less than half the number of lattice elements handled necessarily for a conventional modeling of a 5-cell stack. As a consequence, the solution can be advantageously obtained in comparatively shorter computing times.

Basic to the invention is a model which, in the case of a fuel-cell stack, creates two separate virtual bodies which represent the entire core region of the fuel-cell stack with, for example, 60 individual cells and a volume of about 200×200×360 mm$^3$, each of which is transversed by one fluid. A first body is thus formed by the anode side with the fuel gas medium and the second body corresponding by the cathode side with the air as the medium. The two fictitious bodies thus have the same volumes (auxiliary volumes) as the fuel-cell stacks, for example, a volume of 200×200×360 mm$^3$. In reality, the individual fluid spaces (gas passages or fuel passages) are surrounded by solid material, for example, the ribs of the gas distributor structure. In addition, flow resistance generally applies in the individual fluid spaces. These factors which must be taken into consideration in these fictitious bodies, are treated as a corresponding porosity calculation which can be associated with either one or both of the virtual bodies. Individually from the core region of the fuel-cell stack, the edge region can be treated at least in part as previously was the case, that is, it can be treated in accordance with the custom in the state of the art by subdivision into corresponding grid elements.

The great advantage of this method is that the size of the grid elements in the core region need not be treated any longer in terms of the 1 mm resolution of the actual fluid compartments or gas passages. Rather, the grid elements in the edge region can be advantageously treated in accordance with the state of the art in terms of grid elements with relatively large dimensions while the size of the grid elements core region advantageously can be determined as a function of external conditions. This means that it is possible to utilize a fine grid, for example, with a 1 mm raster or spacing for the upper and lower parts of the core region and a coarser grid, for example, a 5 mm raster between the upper and lower parts. Such a breakdown of the raster advantageously takes into consideration the greater affect of temperature which increases in the upper and lower parts of the core region. By the subdivision of a large real body, like for example, a fuel-cell stack with fine structures (planes with gas passages), the known technique of adaptive computer grids can be applied.

The two virtual bodies (auxiliary volumes) are coupled together by so called "linked meshes". This means that the spatially separated bodies are coupled by software technologically in that each individual grid element of the calculating or computer grid of the first virtual body connected together with a corresponding grid element with the calculating grid of the second virtual body by pointers (references, links). The grid elements of the computing lattices of the two virtual bodies, which are locally at the same place, correspond to one another. The references which associate each lattice element of a first of the computing lattices with a respective lattice element of another of the computing lattices thus serve to implement the physical transport processes between the fluid spaces, for example, the heat transport, the mass transfer, and the electron transport. As a rule, this is achieved by programming in one of the high programming languages (Fortran C or the like).

These transport processes include, on the one hand, those processes which classically have been converted by CFD software or FE software, for example, convective heat transport. In the latter, a certain additional cost is necessary for implementing the method of the invention. Other transport processes which have heretofore also required conventional use of CFD software must be programmed by themselves, but, advantageously, require only a modification of the self-programming functions.

The method of the invention is especially advantageous for such devices which have very small geometries of the fluid spaces, especially narrow passages. This can result in a complex heat exchange using complicated honey-combed structures or can apply to chemical reactors with a large number of individual reaction spaces separated from one another.

BRIEF DESCRIPTION OF THE DRAWING

In the drawing:

FIG. 2 is another schematic illustration of steps of the inventive method; and

FIGS. 3a, 3b, and 3c are detail views of cell stacks.

SPECIFIC DESCRIPTION

Figure 1:
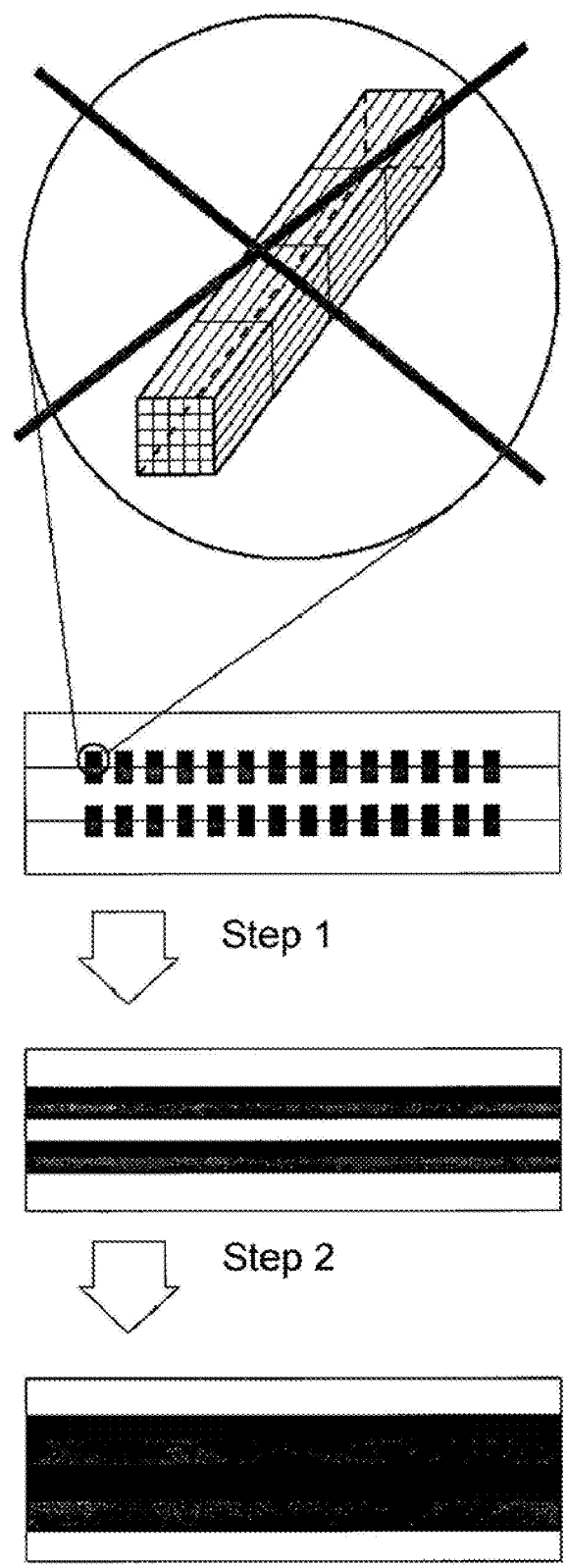
FIG. 1 is a schematic illustration of the method of this invention.

The basic idea of the invention will be described in conjunction with a model of a fuel-cell stack with 60 individual cells through the use of three Figures and a Table, with the understanding that the information is not intended to be limited thereby. There is shown in:

FIG. 1: porous fluid zones in a conventional CFD model with
1. A first application step: planes with gas passages as a porous body; and
2. A second application step: the interconnector incorporated in the porous body.

FIG. 2: the application of the invention to planar FCS, conversion of the porous plates into imaginary auxiliary volumes.

FIGS. 3a-c: computer lattices in various CVD models:
a) One cell of a 5-cell stack, fine computing lattices with 700,000 lattice elements,
b) 5-cell stack; coarse computing lattice with 20,000 lattice elements,
c) 60 cell-stack, coarse computing lattice with 300,000 lattice elements.

In order to develop the operating conditions of the components in system operation without expensive experimental research, these components are subjected to structural and dynamic simulation. This is done especially for a fuel-cell stack with more than 10 and especially more than 40 individual fuel cells. Commercially available tools for 3-dimensional modeling, like for example, Computational Fluid Dynamics (CFD) software, promote the use of unstructured lattices for portraying complex structures. The modeling is achieved with the fluent computer program for the detailed flow simulation and with MALLAB/Simulink for the dynamic simulation. The simulation optimizes flow and thermal relationships in the apparatus and reactors and their incorporation into system operation.

The first stack models, as a generality, customarily are assembled from representative individual cell units. As a result, the size of the simulated stack, as is also generally customary, is limited by the requirements for storage and the computing time to stacks of a maximum of 5 cells. These limitations can be overcome by utilizing the basic concept of the invention of assembling the fluid passage structures into two porous volumes (auxiliary volumes) for the anode side and the cathode side respectively. The boundary regions can be modeled by the state of the art approaches.

Conventional CFD Modeling

The CFD software used makes available so called porous fluid zones. Their most significant feature is the definition of the pressure loss along the space directions within the porous zone as a function of the fluid speed. It is not necessary to solve the Navier-Stoke equation in this region. Even at the beginning of the development of the first fuel cell models, it is clear that the modeling of individual gas passages because of the resulting large computing lattice will require such a large amount of calculating time that large stacks which assemble man such individual cells, for example 60, can practically not be handled in the calculation.

FIG. 1 shows how by means of the conventional application of porous zones, the geometric structure can be simplified and thus represented by small computing lattices requiring reduced calculating time. This corresponds to the state of the art SOFC model referred to below as the "old model". A limiting feature for the magnitude of the lattice elements in a computing lattice is where the height of the porous zone which is modeled and which corresponds to half the structure height of a fuel cell. In a 5-cell stack with cells of a 6 mm structure height and a size of the interconnector plate of about $200 \times 400^2$ mm, requires a computing lattice with 700 lattice elements (more precisely, finite volume) and a computing time usually of more than 72 hours.

The New Method of the Invention

The breakthrough for realizing models for large stacks using the basic concept of the invention of assembling the many porous individual volumes at the anode side to a single volume and doing the same for the cathode size. This step has been schematically illustrated in FIG. 2. With a further feature of the CFD software used, the so-called "linked meshes" both volumes can be coupled together by the software. For means of this coupling, the physical transport processes (heat transport and mass transfer) can be programmed by means of C functions. The consequence is that the size of the individual lattice elements are no longer limited by the height of the actual individual cells but can be oriented from a numerical viewpoint. The influence of this superimposition is clarified in FIG. 3. In each part (a, b, c) of this figure, the same segment of the computing lattice is shown for three CFD models. At (1) the core region of the SOFC is represented for all of the transport processes. This part has also been schematically illustrated in FIGS. 1 and 2. In a stack the individual fuel cells must be supplied by appropriate distributor structures, or so-called "manifolds", with fuel and air. In parallel flow, as in the core region, there are opposite permeable fluid compartments to which the new processes of the invention can be applied. FIG. 3 shows this region at (2).

In FIG. 3a, the computing mesh for an individual cell of a 5-cell stack can be seen as required for simulation utilizing the old CFD model. In FIG. 3b, the computing lattice of the same stack is visible, but as modeled by the new method according to the invention. In FIG. 3c, the calculating lattice has been scaled up to that of a 60 cell stack. In the lower region, the finest stepping of the dimensionally individual lattice elements can be seen and can be compared to those of the remaining lattice elements. These illustrations indicate the independence of the lattice generation from the original height of the fuel cell stack.

It has been found that the initially configured 120,000 finite volumes for the 60-cell stack is too coarse considering the high temperature gradient. As a result, the number of lattice elements is raised to 300,000 in order to more precisely treat the temperature distribution at critical locations within the stack. It has been indicated that in the new model (again) conventional criteria can be used to choose the dimensions of the lattice elements.

|  | Model according to the State of the Art | New Model According to the Invention | |
| --- | --- | --- | --- |
| # of Fuel Cells | 5 | 5 | 60 |
| # of Lattice Elements | ~700,000 | ~20,000 | ~300,000 |
| CPU Time | 3 Days | 6 Hours | 6 Days |

While the old model required 700,000 finite volumes for a 5-cell stack, in the new model the 5-cell stack can be converted satisfactorily with 19,000 finite volumes. For a 60-cell stack for the old model about 8,500,000 lattice elements were required to achieve a satisfactory modeling. The computer time in this case had the disadvantage that it was more than 5 weeks. In addition, the data consequently could not be handled by a single PC of conventional construction so that a 60-cell stack with the old SOFC model could not be simulated by only one PC. By contrast, for the new model, only 300,000 finite volumes are necessary as a rule for a 60-cell stack to obtain adequate results. The simulation can be seen from the table to be practical in about 6 days. These numbers speak for themselves and show clearly that the computing time with the new method is reduced by at least one order of magnitude for the modeling and only now is realistically possible.

The invention claimed is:

1. A computer-implemented method of modeling mass transfer and/or heat transport processes in a fuel-cell stack, the method comprising the steps of sequentially:

modeling a selected region of the stack with at least two fluid components separated from one another by solid material by use of a computer;

transforming each fluid component of the selected region into a respective auxiliary volume in which all of the fluid components and solid material in the region are assembled additionally and whose outer cell corresponds to that of the region;

dividing each auxiliary volume in the same way into a lattice with individual lattice elements so that the smallest dimension of at least one of the lattice elements is twice as great as the corresponding local hydraulic diameter in the selected region of the device;

linking each lattice element of a first of the lattices by references with a respective lattice element of the other lattice so that linked or coupled computing lattices result;

implementing the exchange between the fluids in the fuel-cell stack via the references of the respective component lattices, whereby a model is generated that simulates the operation of the fuel-cell stack.

2. The method according to claim 1 wherein for carrying out the modeling steps, Computational Fluid Dynamics (CFD) finite element (FE), finite volume (FV) or finite difference software is used.

3. The model according to the claim 1 wherein the mass transfer and/or heat transport are modeled in a device with two fluid spaces.

4. The method according to claim 1 wherein the core region of the fuel cell stack is chosen as the selected region.

5. The method according to claim 1 wherein the core region of a fuel cell stack with more than 20 individual cells, especially with more than 40 individual cells, and particularly especially with more than 60 individual cells is chosen as the selected region.

6. The method according to claim 1 wherein a first auxiliary volume is formed for the fuel and a further auxiliary volume is formed for the oxidation agent.

7. The method according to claim 1 wherein the smallest dimension of the lattice element on two respectively opposite sides of the computer grating is smaller than that in an intermediate region of the computing grating.

8. A computing program on a computer-readable storage medium storing computer executable instructions executable for carrying out the method according to claim 1.

9. The program according to claim 8 wherein the instructions are a C program.

10. A method of operating a fuel-cell stack in which to determine at least one operating parameter, a method according to claim 1 is used.

11. The method according to the claim 10 wherein the operating parameter which is obtained is selected from the amount of fuel, or the amount of oxidation agent, or the pressure in the fuel-cell stack, or the temperature at which the operating agent is introduced.

12. The method of producing a fuel-cell stack wherein further design of at least one of the components of the fuel-cell stacks, a model according to claim 1 is used.

13. The method according to the claim 12 wherein the component is selected from the distributor structure and/or means for cooling.

14. The use of the method according to claim 1 for determining at least one operating parameter for separating a fuel-cell stack.

15. The method according to the preceding claim, wherein the operating parameter determined is selected from the amount of fluid or the amount of oxidating agent and/or the pressure in the fuel-cell stack or the inlet temperature of an operating agent.

16. The use of the method according to claim 1 for the design of at least one component in the production of a fuel-cell stack.

17. The use according to the preceding claim in which the component is selected from the distributor structure or the cooling means.

\* \* \* \* \*